(No Model.)
J. FRYE.
DEVICE FOR OPENING OR CLOSING DOORS OF VEHICLES.
No. 566,900. Patented Sept. 1, 1896.
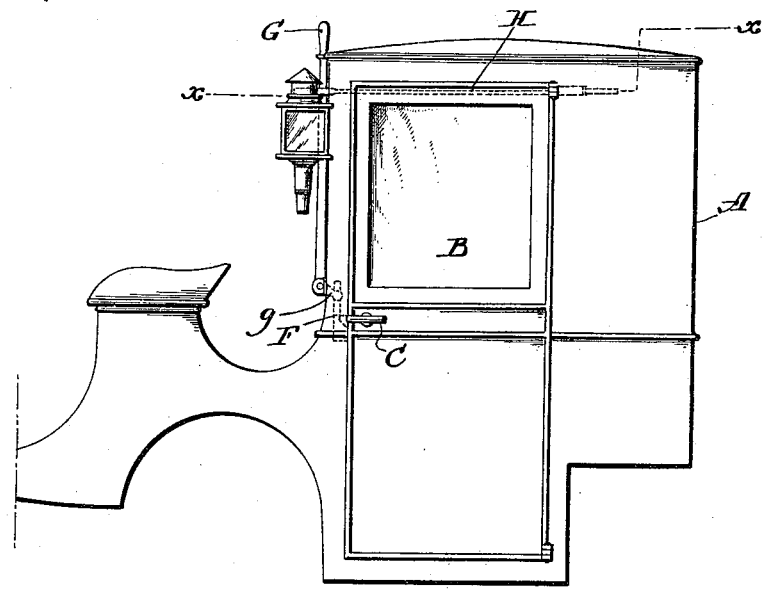
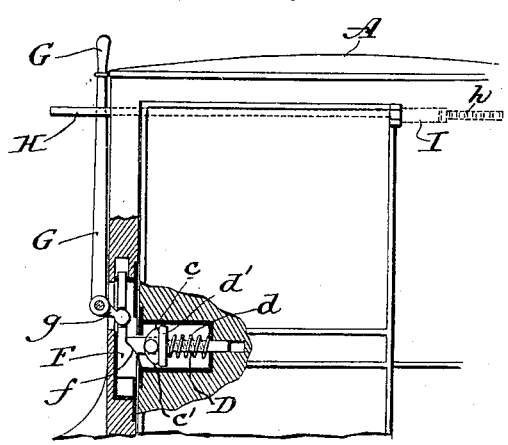
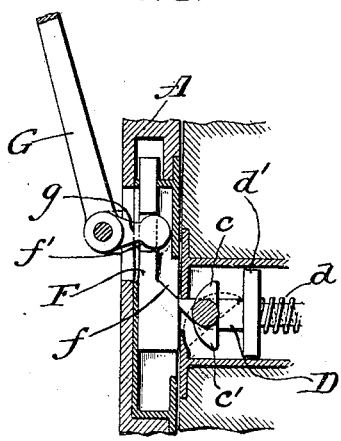
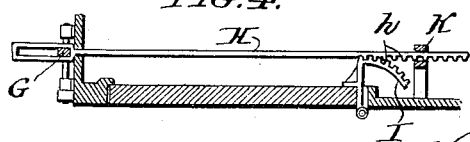
Witnesses.
George F. Drury
Ever. J. Frost
Inventor.
James Frye
By David J. Williams
Attorney.

UNITED STATES PATENT OFFICE.

JAMES FRYE, OF PHILADELPHIA, PENNSYLVANIA.

DEVICE FOR OPENING OR CLOSING DOORS OF VEHICLES.

SPECIFICATION forming part of Letters Patent No. 566,900, dated September 1, 1896.

Application filed October 18, 1895. Serial No. 566,074. (No model.)

*To all whom it may concern:*

Be it known that I, JAMES FRYE, a citizen of the United States, residing at Philadelphia, in the county of Philadelphia and State of Pennsylvania, have invented certain new and useful Improvements in Devices for Opening or Closing the Doors of Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in devices for opening and closing the doors of vehicles; and it consists, mainly, in providing a device which can be operated by the driver of a vehicle from the seat he occupies to first release the latch and then open or close the door.

Referring to the accompanying drawings, Figure 1 is a side elevation of the body of a vehicle, showing the manner of applying my invention. Fig. 2 is a view, slightly enlarged and partly in section, showing the relative position of the various parts of my device when the door of the vehicle is closed and latched. Fig. 3 is an enlarged section similar to that shown in Fig. 2 with the lever moved forward to release the latch, and Fig. 4 is a section on the line $x\,x$ of Fig. 1.

Similar letters of reference refer to similar parts throughout the several views of the drawings.

A represents the body portion of the vehicle. B is the door, and C the handle for operating the latch. The latch consists of a bar D, acted upon by a spring $d$, which tends to keep said bar in engagement with the opening in the plate E in the door-frame. The handle is provided with cams $c$ and $c'$, which act upon the projecting portion $d'$ of the bar D, and by which means the bar D may be released from the plate E by turning the handle in either direction. Back of the plate E is confined a sliding plate F, having an inclined surface $f$ corresponding to a similar inclined surface on the bar D. The plate F is recessed at a point $f'$ for the reception of the short arm $g$ of the lever G. This lever is fulcrumed to the front of the vehicle-body by suitable brackets and extends upward a short distance above the top of the vehicle. One end of a slotted bar H embraces the lever G and extends back into the inside of the vehicle, the opposite end of said bar having a rack $h$ formed upon it which engages a segmental rack I, which is mounted upon the door B. Inside of the vehicle the bar H is guided in front by passing through the framework of the vehicle and at the back by a bracket K, through which the rack passes. The object of the slot $h'$ in the bar H is to allow the lever G to move forward for the purpose of unlatching the door prior to operating the lever H, which opens the door through the medium of the segmental rack I.

Having now described my invention, what I claim, and desire to secure by Letters Patent, is—

1. A device for opening and closing the doors of vehicles comprising a segmental rack mounted upon the door of the vehicle, a toothed bar adapted to engage said rack, a pivoted lever adapted to a slot in said bar, said lever being provided at one end with a sliding plate adapted to release the latch of the door, substantially as specified.

2. A device for unlatching the doors of vehicles comprising a lever G, having an arm, $g$, sliding plate, F, provided with an inclined surface adapted to a corresponding inclined surface on the bar D, a bar H having a slotted portion embracing the lever, G, a rack formed upon said bar and adapted to engage a segmental rack mounted upon the door of the vehicle, substantially as specified.

3. A device for unlatching the doors of vehicles comprising a sliding plate having an inclined surface engaging the latch-bolt upon the door, and a pivoted lever with a short arm adapted to move the sliding plate.

In testimony whereof I affix my signature in presence of two witnesses.

JAMES FRYE.

Witnesses:
GEORGE F. DRURY,
DAVID S. WILLIAMS.